(12) United States Patent
Zhuang et al.

(10) Patent No.: US 12,488,952 B2
(45) Date of Patent: Dec. 2, 2025

(54) CONTROL METHOD AND CONTROL DEVICE FOR ELECTRIC SWITCH, AND ELECTRIC SWITCH

(71) Applicant: Schneider Electric Industries SAS, Rueil Malmaison (FR)

(72) Inventors: Hao Zhuang, Shanghai (CN); Bing Shuang, Shanghai (CN); Juan Xie, Shanghai (CN); Yuanzhong Wang, Shanghai (CN); Vincent Geffroy, Eybens (FR); Zhiping Huan, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 60 days.

(21) Appl. No.: 18/373,469

(22) Filed: Sep. 27, 2023

(65) Prior Publication Data
US 2024/0120159 A1    Apr. 11, 2024

(30) Foreign Application Priority Data
Sep. 29, 2022   (CN) .......................... 202211204698.X

(51) Int. Cl.
*H02H 3/00* (2006.01)
*H01H 9/54* (2006.01)

(52) U.S. Cl.
CPC ..................................... *H01H 9/54* (2013.01)

(58) Field of Classification Search
None
See application file for complete search history.

(56) References Cited

U.S. PATENT DOCUMENTS 4,513,835 A * 4/1985 Fukino ..................... B62D 6/00
                                                                      180/422
4,720,763 A    1/1988 Bauer
(Continued)

FOREIGN PATENT DOCUMENTS

| CN | 110931312 A | 3/2020 |
| DE | 102020005313 A1 | 3/2021 |

OTHER PUBLICATIONS

Extended European Search Report dated Feb. 2, 2024 for corresponding European Patent Application No. 23306607.5-1201, 6 pages.

*Primary Examiner* — Stephen W Jackson
(74) *Attorney, Agent, or Firm* — Wolf, Greenfield & Sacks, P.C.

(57) ABSTRACT

Embodiments of the present disclosure provide a control method and a control device for an electric switch, and an electric switch. The control method includes: obtaining a voltage signal representing a control voltage, the control voltage input to the electric switch and applied to an electromagnetic assembly of the electric switch via a regulation device of the electric switch; determining, based on the voltage signal obtained, a target control parameter for the electromagnetic assembly, the target control parameter comprising at least one of a target voltage and a target current; and generating, based on the target control parameter determined, a control signal for the regulation device, to cause the electromagnetic assembly to drive a movable contact of the electric switch to contact a static contact of the electric switch. The solution of the present disclosure can effectively reduce wear of contact points of contacts, to thus prolong the service life of the electric switch.

10 Claims, 8 Drawing Sheets

(56) References Cited

U.S. PATENT DOCUMENTS

| | | | |
|---|---|---|---|
| 5,930,104 A | 7/1999 | Kadah et al. | |
| 2007/0209827 A1* | 9/2007 | Kruschke | H01H 1/58 |
| | | | 174/126.1 |
| 2021/0082646 A1 | 3/2021 | Kawaguchi et al. | |
| 2022/0310340 A1* | 9/2022 | Gutmann | H01H 50/54 |

* cited by examiner

CONTROL METHOD AND CONTROL DEVICE FOR ELECTRIC SWITCH, AND ELECTRIC SWITCH

CROSS-REFERENCE TO RELATED APPLICATION

This application claims priority to and the benefit of Chinese Patent Application Serial No. 202211204698.X, filed on Sep. 29, 2022.

FIELD

Embodiments of the present disclosure generally relate to the field of electric devices, in particular a control method and a control device for an electric switch, and the electric switch comprising the control device.

BACKGROUND

Electric switches such as contactors are widely applied to electric systems or power distribution systems, and can implement ON and OFF control for electric lines in the electric systems or power distribution systems by performing closing and opening operations. In an opening operation, movable and static contacts of an electric switch are separated from each other to disconnect an electric line, and in a closing operation, the movable and static contacts are switched from the separated state to the contacting state to connect the electric line.

In the closing operation of the electric switch, the movable contact moves towards the static contact and contacts the latter, probably generating wear at a contact point (also referred to as silver point) between the movable and static contacts. If the closing speed of the movable contact is too high relative to the static contact, it will cause excessive wear of the contact point, which may reduce the service life of the contacts and the electric switch. In addition, an exceedingly high closing speed may also bring about some other problems, for example, mechanical interlock failure between two contacts.

SUMMARY

In order to at least partly solve the above-mentioned problem and other possible problems, embodiments of the present disclosure provide a control method and a control device for an electric switch, and the electric switch comprising the control device.

In accordance with a first aspect of the present disclosure, there is provided a control method for an electric switch, comprising: obtaining a voltage signal representing a control voltage, the control voltage input to the electric switch and applied to an electromagnetic assembly of the electric switch via a regulation device of the electric switch; determining, based on the voltage signal obtained, a target control parameter for the electromagnetic assembly, the target control parameter comprising at least one of a target voltage and a target current; and generating, based on the target control parameter determined, a control signal for the regulation device, to cause the electromagnetic assembly to drive a movable contact of the electric switch to contact a static contact of the electric switch.

According to the embodiments of the present disclosure, for a certain range of control voltage, the electric switch can always have a relatively stable closing speed, avoiding impact and wear of closing speed fluctuations on the contacts, and can eliminate problems such as mechanical interlock failure, and the like, thus improving the system operation reliability.

In some embodiments of the present disclosure, determining, based on the voltage signal obtained, the target control parameter for the electromagnetic assembly comprises: in response to the control voltage being less than a first threshold, determining the target voltage as a first voltage value; in response to the control voltage being not less than a second threshold, determining the target voltage as a second voltage value, the second threshold being greater than the first threshold, and the second voltage value being less than the first voltage value; and in response to the control voltage being not less than the first threshold and less than the second threshold, calculating, based on the voltage signal representing the control voltage, a third voltage value between the first voltage value and the second voltage value, and determining the target voltage as the third voltage value. According to those embodiments, it is guaranteed that the electric switch can reliably implement closing at a low control voltage, and the closing speed at a high control voltage is not too great, so as to ensure the reliable operation of the electric switch and avoid damage or excessive wear of the contact point of the contacts caused by an exceedingly high closing speed.

In some embodiments of the present disclosure, the third voltage value is linearly reduced from the first voltage value to the second voltage value as the control voltage is increased from the first threshold to the second threshold. According to the embodiments, the closing speed of the electric switch can be reduced in a simple and effective way at a stage where a high control voltage is provided.

In some embodiments of the present disclosure, determining, based on the voltage signal obtained, the target control parameter for the electromagnetic assembly comprises: in response to the control voltage being less than a second threshold, determining the target current as a first current value; and in response to the control voltage being not less than the second threshold, determining the target current as a second current value that is less than the first current value. According to those embodiments, the present disclosure can guarantee the reliable operation of the electric switch while avoiding excessive wear of the contact point of contacts caused by an exceedingly high closing speed.

In some embodiments of the present disclosure, the first threshold is selected such that: when the control voltage is equal to the first threshold, a closing speed of the movable contact driven by the electromagnetic assembly can reach a first predetermined speed; and when the control voltage is less than the first threshold, the closing speed of the movable contact driven by the electromagnetic assembly cannot reach the first predetermined speed. According to those embodiments, an appropriate threshold can be selected to divide low and high control voltage stages, such that different target control parameters can be used for different voltage stages to improve the control process of the closing operation.

In some embodiments of the present disclosure, the first voltage value is selected such that: when a value of the target voltage is equal to the first voltage value and the control voltage is equal to a predetermined voltage, the electromagnetic assembly can drive the movable contact to contact the static contact, the predetermined voltage being less than the first threshold. According to those embodiments, an appropriate target voltage can be selected to ensure successful closing at a low control voltage.

In some embodiments of the present disclosure, the second threshold is selected such that: when a value of the target voltage is equal to the second voltage value and the control voltage is equal to the second threshold, a closing speed of the movable contact driven by the electromagnetic assembly is stopped from continuing to increase with increase of the control voltage. According to those embodiments, the stage where the increase of the control voltage does not have a significant effect on the closing speed can be determined, which is helpful to simplify the control process.

In accordance with a second aspect of the present disclosure, there is provided a control device for an electric switch, comprising: a processor; and a memory coupled to the processor and having instructions stored therein, where the instructions, when executed by the processor, cause the control device to execute the method in accordance with the first aspect.

In accordance with a third aspect of the present disclosure, there is provided an electric switch comprising the control device for the electric switch in accordance with the second aspect.

In accordance with a fourth aspect of the present disclosure, there is provided a computer readable storage medium having computer program code stored thereon, where the computer program code, when running, executes the method in accordance with the first aspect.

The Summary is to introduce a selection of concepts in a simplified form that are further described below in the Detailed Description. This Summary is not intended to identify key features or essential features of the present disclosure as described herein, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments with reference to the accompanying drawings, where the same or similar reference symbols refer to the same or similar components.

DETAILED DESCRIPTION OF IMPLEMENTATIONS

Figure 1:
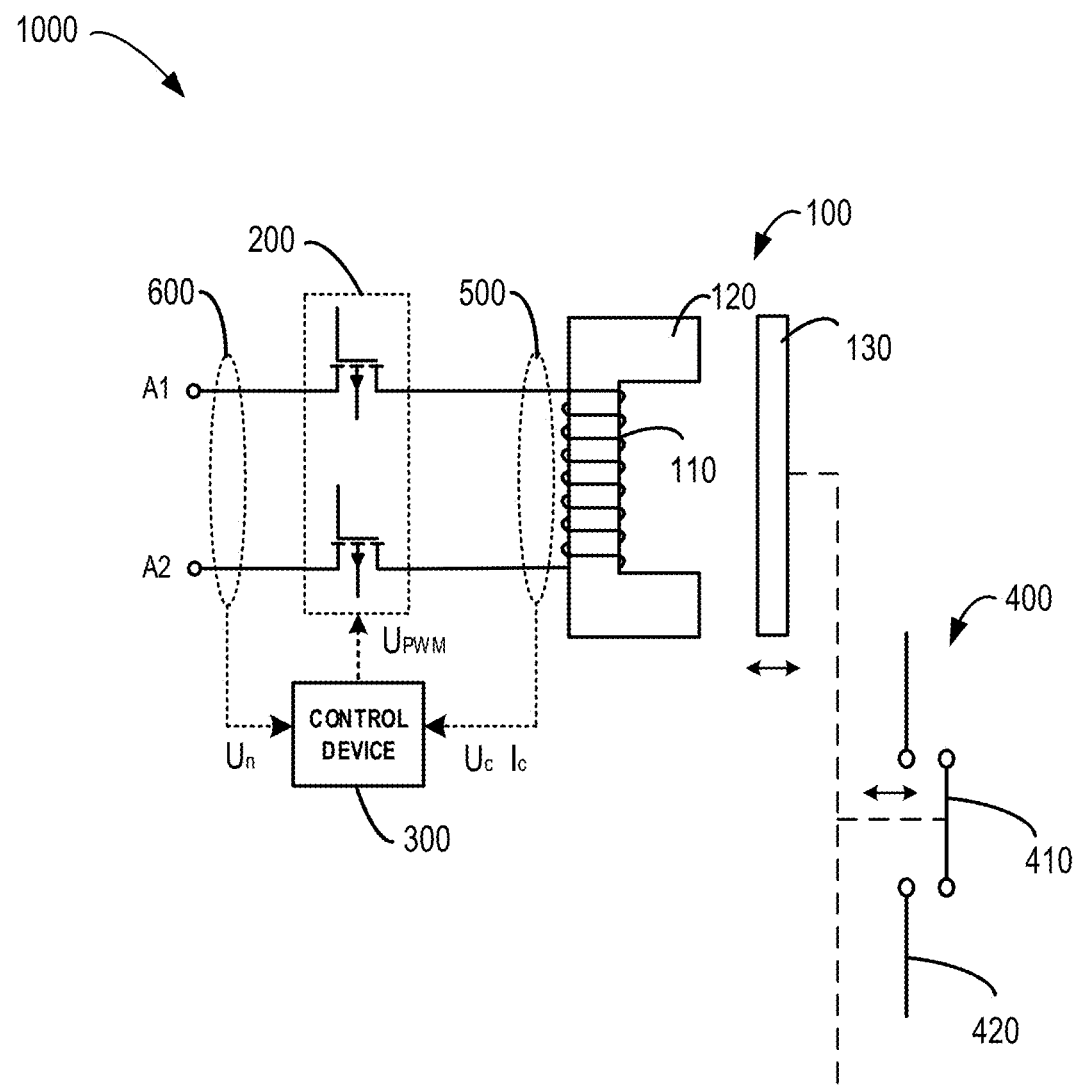
FIG. 1 illustrates an example circuit diagram of an electric switch where embodiments of the present disclosure can be implemented.

Reference will now be made to the drawings to describe in detail the implementations of the present disclosure. Although some implementations of the present disclosure are shown in the drawings, it would be appreciated that the present disclosure could be implemented in various forms, which should not be confined to the implementations as described here. Rather, those implementations are provided for understanding the present disclosure thoroughly and completely. It would also be appreciated that the drawings and the implementations of the present disclosure are provided only as an example, rather than suggesting limitation to the protection scope of the present disclosure.

As used in the description of the implementations of the present disclosure, the term "includes" and its variants are to be read as open terms that mean "includes, but is not limited to." The term "based on" is to be read as "based at least in part on." The term "an embodiment/implementation" or "the embodiment/implementation" is to be read as "at least one embodiment/implementation." The terms "first," "second," and the like may refer to different objects or the same object. Other explicit or implicit definitions may be included hereinafter.

FIG. 1 illustrates an example circuit diagram of an electric switch 1000 where embodiments of the present disclosure can be implemented. The electric switch 1000 may be a contactor, a circuit breaker, or other type of electric switch. As shown therein, the electric switch 1000 includes control terminals A1 and A2, an electromagnetic assembly 100, a regulation device 200, a control device 300, a contact assembly 400, and a sensing device 500. Specifically, the control terminals A1 and A2 are coupled to an electromagnetic coil 110 of the electromagnetic assembly 100 via the regulation device 200, where the electromagnetic coil 110 is wound onto a static magnetic core 120 of the electromagnetic assembly 100. A movable contact 410 of the contact assembly 400 can be mechanically coupled to a movable magnetic core 130 of the electromagnetic assembly 100, and therefore can move along with the movable magnetic core 130 as an effect of the electromagnetic force from the electromagnetic assembly 100, to separate from or contact with the static contact 420. In addition, the control device 300 may be coupled to the regulation device 200 and the sensing device 500. The regulation device 200 may include, for example, a solid state switching device, including, but not limited to, an Insulated Gate Bipolar Translator (IGBT), a Junction Field-Effect Transistor (JFET), a Bipolar Junction Transistor (BJT), a Metal-Oxide-Semiconductor Field Effect Transistor (MOSFET), a Gate Turn Off thyristor (GTO), a MOS-Controlled Thyristor (MCT), an Integrated Gate-Commutated Thyristor (IGCT), a silicon carbide (SiC) switching device, a gallium nitride (GaN) switching device, or other power switching device. However, rather than being not limited to those devices listed above, the regulation device 200 may be any appropriate device capable of regulating a voltage and a current. In addition, the number of regulation devices 200 are not restricted to that shown in FIG. 1, which may be larger or smaller. For example, there may be only one regulation device. It would be appreciated that the above description only exemplarily illustrates the configuration of the electric switch 1000, and the electric switch 100 may further include other appropriate components and devices for implementing its switching function, or some components and devices therein may be omitted or replaced as actually required.

When an external AC power supply or DC power supply is connected to the control terminals A1 and A2 of the electric switch 1000, an AC or DC control voltage Un is applied to the control terminals A1 and A2, and then generates a regulated voltage Uc and a regulated current Ic across the electromagnetic assembly 100 (i.e., the electromagnetic coil).

Meanwhile, the control device 300 may receive, from the sensing device 500, a sensing signal indicating the regulated voltage Uc and the regulated current Ic, and the control device 300 may be provided with a target voltage and a target current. Accordingly, the control device 300 may control the regulation device 200 based on comparison between a sensed value and a target value, to implement closed-loop control of the voltage and the current of the electromagnetic assembly 100, causing the regulated voltage Uc and/or the regulated current Ic of the electromagnetic assembly 100 to reach or approximate a target voltage and/or target current. In this way, the electromagnetic assembly 100 can generate a desired electromagnetic force to attract the movable magnetic core such that the movable contact can move at a sufficient closing speed to implement the closing operation.

Typically, electric switch products such as contactors, or the like, are required to successfully implement closing at a control voltage within a certain range. The voltage range is, for example, from Unmin to Unmax, and the voltage range may be extended to a range from 0.8 Unmin to 1.1 Unmax during product testing, to guarantee the product reliability. This means that the electric switches need to have a sufficient closing speed at a control voltage ranging from 0.8 Unmin to 1.1 Unmax.

The legacy control solution includes setting the same target voltage and target current at the control voltage between 0.8 Unmin and 1.1 Unmax. According to the legacy solution, there may be great differences or fluctuations in the closing speed at different control voltages, resulting in some problems. For example, if the target voltage and the target current are set to a high value, respectively, to at least guarantee that the minimum closing speed meeting the closing requirement can still be obtained at the minimum control voltage of 0.8 Unmin, the target control parameters set in this way may cause the movable contact to generate an exceedingly high closing speed at a higher control voltage of Unmax or 1.1 Unmax. As described above, the exceedingly high closing speed may cause premature failure or severe wear of the contact point of contacts, thus shortening the service life of the contacts and the electric switch. In contrast, if the target voltage and the target current are set to a low value, respectively, to reduce the closing speed at the control voltage of Unmax or 1.1 Unmax, this may lead to an insufficient closing speed at the voltage of 0.8 Unmin or Unmin, resulting in unstable closing, or even making the movable contact unable to complete the closing stroke and thus leading to a failure at implementing the closing operation.

In addition, an exceedingly high closing speed may result in mechanical interlock failure. For example, for two contactors having a mechanical interlock function, if one contactor is in the closed state, the other one should be mechanically locked to be prevented from being closed. In other words, by means of mechanical interlocking, the mechanically interlocked contactor still cannot enter the closed state even if the closing operation is performed. However, in the mechanically locked contactor, the main shaft of the contactor is locked only at one end while the other end of the main shaft can still rotate freely to a certain extent. As such, if the mechanically locked contactor is closed by mistake, the free end of the main shaft will still rotate along the closing direction, with the locked end of the main shaft as a fulcrum, as an effect of a resultant force of various forces such as an electromagnetic force, a mechanical counterforce, and the like. Since the closing speed is positively related to the resultant force, the resultant force is increased when the closing speed becomes greater. When the resultant force is increased to a certain degree, the free end of the main shaft moves a great distance along the closing direction, even causing the movable contact and the static contact of the mechanically locked contactor to come into contact, and thus lead to mechanical interlock function failure. This may cause a malfunction or an accident in the electrical or distribution system.

The embodiments of the present disclosure provide an improved control solution for an electric switch. In the improved solution, different target control parameters may be determined for different control voltages. As such, the electric switch can always have a relative stable closing speed within the required control voltage range, to guarantee that the electric switch can reliably implement closing at a low control voltage, and the closing speed at a high control voltage is not too great, to avoid damage or excessive wear of the contact points of the contacts and eliminate the problem such as mechanical interlock failure, thereby improving the system operation reliability.

Figure 2:
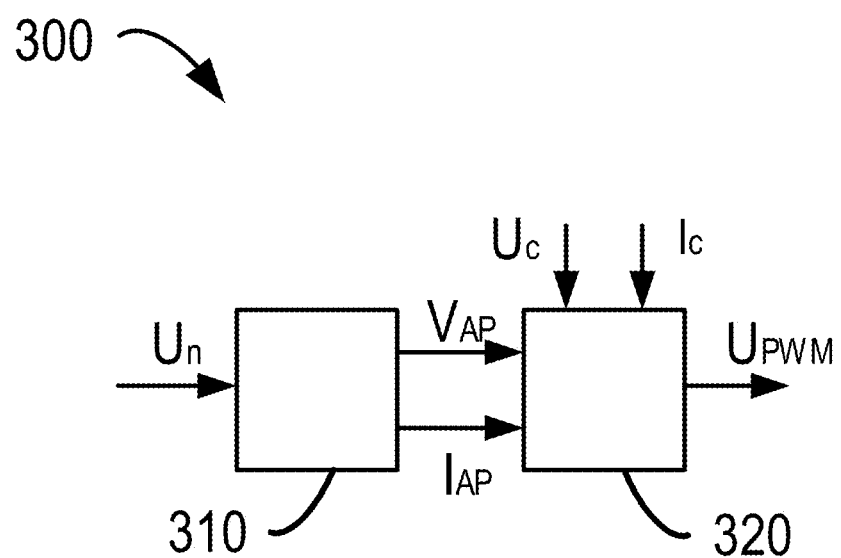
FIG. 2 illustrates a schematic block diagram of a control device according to embodiments of the present disclosure.

FIG. 2 illustrates a schematic block diagram of control device 300 according to embodiments of the present disclosure. As shown therein, the control device 300 may include a target parameter module 310 and a control signal module 320. The control device 300 may acquire, from the sensing device 600 (as shown in FIG. 1), a control voltage Un of an electric switch 1000 to input the same to the target parameter module 310. The target parameter module 310 generates a target control parameter that includes at least one of a target voltage $V_{AP}$ and a target current $I_{AP}$. The target control parameters $V_{AP}$ and/or $I_{AP}$ are input into the control signal module 320. The control signal module 320 receives sensing signals Uc and/or Ic from the measurement device 500, and generates a control signal $U_{PWM}$ for controlling the regulation device 200. The control signal $U_{PWM}$ may be output to the regulation device 200, for example, a gate or a base of switching devices, to control the regulation device 200 and thus implement control or regulation of the voltage and/or current applied to the electromagnetic assembly 100.

It would be appreciated that the control device 300 and modules thereof may be implemented in the form of including one or more controllers of the processing device, in the form of an analog circuit and/or digital circuit, or a combination of the multiple forms as mentioned above, where the controller may include, but is not limited to, a Central Processing Unit (CPU), a Digital Signal Processor (DSP), a Field Programmable Gate Array (FPGA), an Application Specific Integrated Circuit (ASIC), an Application Specific Standard Product (ASSP), a System On Chip (SOC), a Complex Programmable Logic Device (CPLD), or any appropriate processor, controller, microprocessor, or the like. In addition, when the control device 300 needs to process a digital signal, the control device 300 or a peripheral device thereof may further include an appropriate analog-to-digital and digital-to-analog conversion device.

Figure 3:
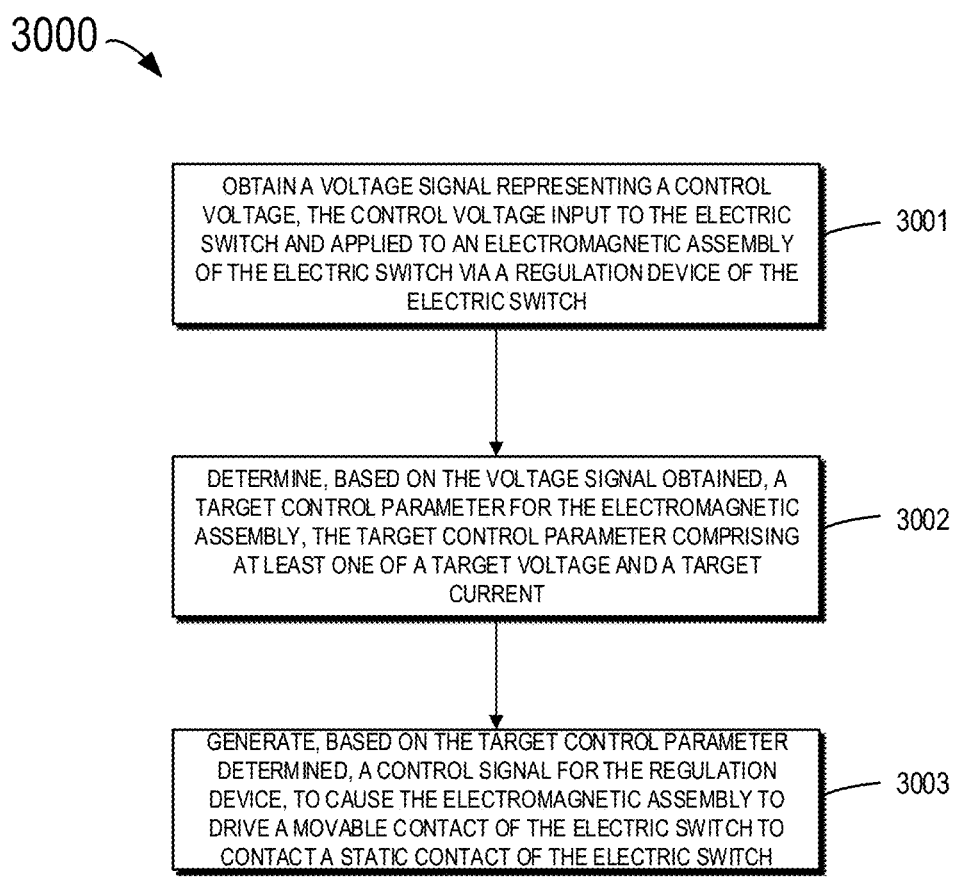
FIG. 3 illustrates a schematic flowchart of a control method for an electric switch according to embodiments of the present disclosure.

FIG. 3 illustrates a schematic flowchart of a control method 3000 for an electric switch 1000 according to embodiments of the present disclosure. The control method 3000 may be implemented in the electric switch 1000 as shown in FIG. 1 and executed by the control device 300 of the electric switch 1000. It would be appreciated that the various aspects as described with reference to FIGS. 1 and 2 can be applied to the control method 3000. For the purpose of discussion, reference will be made to FIGS. 1 and 2 to describe the method 3000.

At block 3001, the control device 300 obtains a voltage signal representing a control voltage Un, and the control voltage Un is input to the electric switch 1000 and applied to the electromagnetic assembly 100 of the electric switch 1000 via the regulation device 200 thereof. As an example, the control device 300 may directly acquire a sensing signal of the control voltage Un from the sensing device 600, or may indirectly determine the control voltage Un (for example, calculate or derive the Un based on other sensing signals). The voltage signal representing the control voltage Un may be input to the target parameter module 310 of the control device 300.

At block 3002, the control device 300 determines, based on the obtained voltage signal, a target control parameter for the electromagnetic assembly 100, where the target control parameter includes at least one of a target voltage $V_{AP}$ and a target current $I_{AP}$. For example, the target parameter module 310 of the control device 300 may determine, based on a voltage signal representing the control voltage Un, specific target control parameters $V_{AP}$ and $I_{AP}$. In this way, the target parameter module 310 of the control device 300 may provide different target control parameters for different control voltages Un, rather than always using the same target control parameter.

At block 3003, the control device 300 generates a control signal $U_{PWM}$ for the regulation device 200 based on the determined target control parameter, to cause the electromagnetic assembly 100 to drive the movable contact 410 into contact with the static contact 420. For example, for different control voltages Un, the target parameter module 310 of the control device 300 may generate different target control parameters $V_{AP}$ and $I_{AP}$. The control signal module 320 may use different target control parameters $V_{AP}$ and $I_{AP}$ at different control voltages to generate control signals $U_{PWM}$. Then, the regulation device 200 may execute ON and OFF operations based on the control signals $U_{PWM}$ at, for example, a certain duty cycle, such that the desired voltage or current can be applied to the electromagnetic assembly 100 to generate the required electromagnetic force, thus driving the movable contact to move at a closing speed as required. In some embodiments, the control signal module 320 of the control device 300 may employ both voltage regulation and current regulation. In an embodiment, the control signal module 320 may use integral regulation of a voltage difference (i.e., a difference between a target voltage $V_{AP}$ and an instantaneous voltage Uc) upon starting the closing operation of the electric switch 1000. When the instantaneous current Ic is greater than the target current $I_{AP}$, current proportional integral regulation is employed. Then, if the instantaneous current Ic is less than a certain proportion (e.g. 0.95) of the target current $I_{AP}$, integral regulation of the voltage difference is employed. However, it would be appreciated that the control manner of the control signal module 320 is not limited to this, and any appropriate control manner may be adopted to control the voltage and/or current of the electromagnetic assembly 100.

In the control method 3000, by acquiring a real-time control voltage and determining a target control parameter based on the control voltage, different target control parameters may be employed at different control voltages to implement control, such that the target control parameter can be adapted to the current control voltage. In this way, when the control voltage is varied in the range from 0.8 Unmin to 1.1 Unmax, the closing speed of the electric switch can be substantially kept stable while ensuring completion of the contact closing. Therefore, the closing speed of the electric switch 1000 will not be too great, causing excessively wear of the contact point of the contact or other problems, or will not be too low, resulting in unstable closing or a failure at closing.

Figure 4:
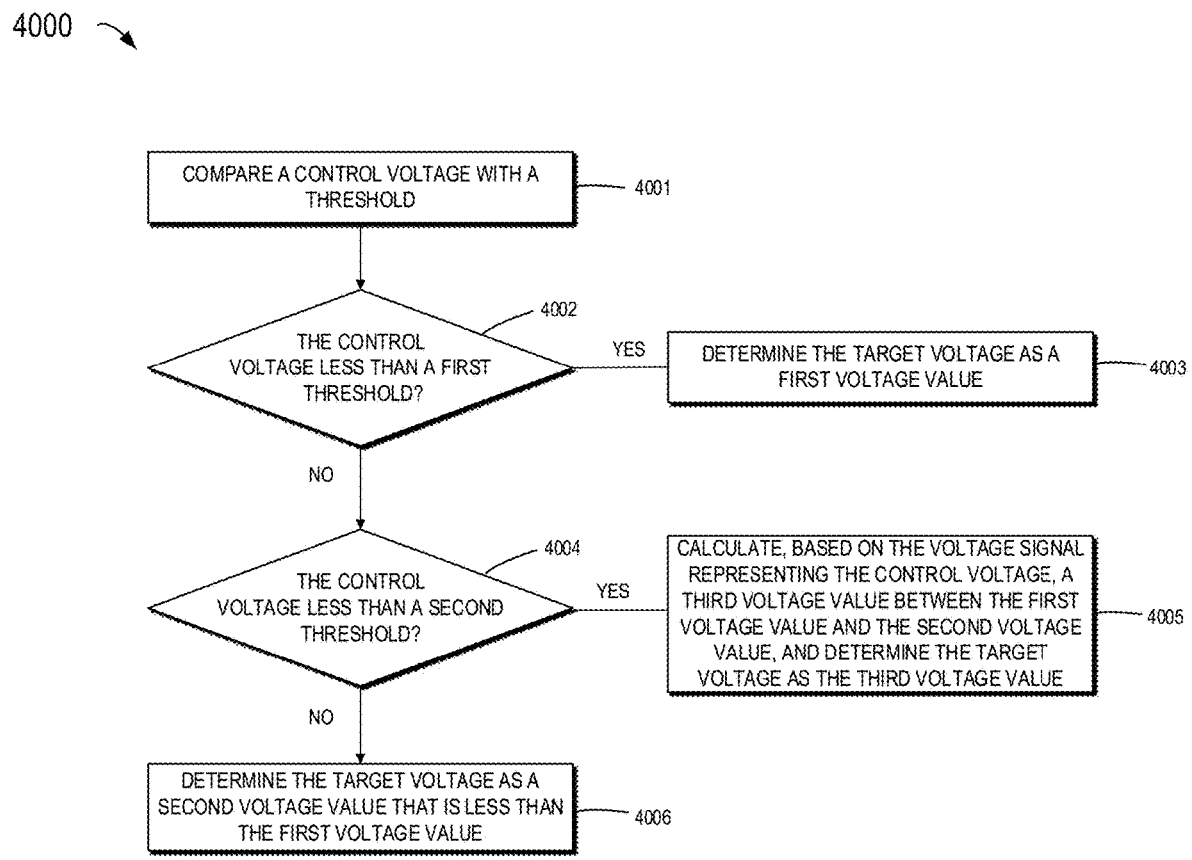
FIG. 4 illustrates a schematic flowchart of an example process of determining a target control parameter according to embodiments of the present disclosure.

FIG. 4 illustrates a schematic flowchart of an example process 4000 of determining a target voltage in the target control parameters. The process as shown in FIG. 4 may be implemented at block 3002 of FIG. 3.

At block 4001, the control device 300 compares the control voltage Un to a threshold. For example, the target parameter module 310 of the control device 300 may preset a plurality of thresholds. These thresholds are all within the voltage range from 0.8 Unmin to 1.1 Unmax, as stated above, of the control voltage Un, and may at least include a first threshold UT1 and a second threshold UT2, where the second threshold UT2 may be greater than the first threshold UT1. After receiving the voltage signal representing the control voltage Un, the target parameter module 310 may compare the control voltage Un with the first threshold UT1 and the second threshold UT2, respectively.

At block 4002, the control device 300 determines whether the control voltage Un is less than the first threshold UT1.

At block 4003, if the control voltage Un is less than the first threshold UT1, the control device 300 determines the target voltage as a first voltage value $V_{AP\_S1}$. For example, the target parameter module 310 of the control device 300 may preset a plurality of target voltages. These target voltages at least include a first voltage value $V_{AP\_S1}$ and a second voltage value $V_{AP\_S3}$, where the first voltage value $V_{AP}$si is greater than the second voltage value $V_{AP\_S3}$. When the control voltage Un is less than the first threshold UT1, it can be determined that the control voltage Un is at a first stage where the voltage is low, and the target voltage at the first stage is set to a higher first voltage value $V_{AP\_S1}$, to ensure that the electromagnetic assembly 100 can drive the movable contact 410 at a low control voltage to move in a sufficiently high closing speed, to thus successfully implement closing. In addition, in order to simplify control, the target voltage at this stage, namely the first voltage value $V_{AP\_S1}$, may be constant.

At block 4004, if the control voltage Un is not less than the first threshold UT1, the control device 300 determines whether the control voltage Un is less than the second threshold UT2.

At block 4005, if the control voltage Un is less than the second threshold UT2, the control device 300 calculates a third voltage value between the first voltage value $V_{AP\_S1}$ and the second voltage value $V_{AP\_S3}$ based on the voltage signal representing the control voltage Un, and determines the target voltage as the third voltage value. For example, when the control voltage Un is not less than the first threshold UT1 but less than the second threshold UT2, it can be determined that the control voltage Un is at a second stage where the voltage value is intermediate. At the second stage, the change of the control voltage may significantly impact the closing speed. Therefore, in order to counteract this effect, the third voltage value as the target voltage may be varied with the control voltage Un, to change the target voltage in real time. As such, the target voltage can be adapted to the current control voltage Un, to avoid a large fluctuation in the closing speed.

In some embodiments of the present disclosure, as the control voltage Un is increased from the first threshold UT1 to the second threshold UT2, the third voltage value is linearly reduced from the first voltage value $V_{AP\_S1}$ to the second voltage value $V_{AP\_S3}$. Specifically, the third voltage value as the target voltage may be linearly reduced as the control voltage Un increases. This may prevent the closing speed from continuously increasing as the control voltage Un increases, to maintain the closing speed at a relatively low level and thus avoid impact and damage generated by an excessively high closing speed on the contacts. It would be appreciated that the change of the third voltage value relative to the control voltage Un is not limited to this, but the third voltage value may be changed in any other appropriate manner, for example, a non-linear manner, and may be changed from a voltage value higher or lower than the first voltage value $V_{AP\_S1}$ to a voltage value higher or lower than the second voltage value $V_{AP\_S3}$.

At block 4006, if the control voltage Un is greater than the second threshold UT2, the control device 300 determines the target voltage as the second voltage value $V_{AP\_S3}$. For example, when the control voltage Un is greater than the second threshold UT2, it can be determined that the control voltage Un is at a third stage where the voltage is high. At the third stage, the control voltage Un is high, and the target voltage therefore may be set to the lower second voltage value $V_{AP\_S3}$, to ensure that the closing speed at the third stage is not exceedingly great. Moreover, since the continuous increase of the control voltage Un at the third stage does not obviously change the closing speed, the second voltage value $V_{AP\_S3}$ may be a constant value.

Figure 5:
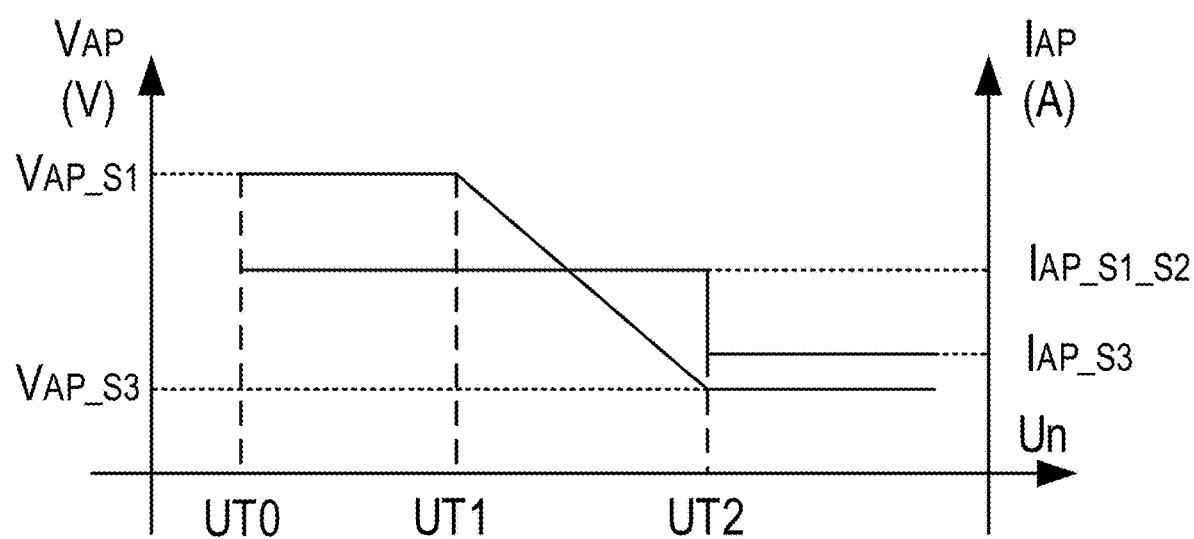
FIG. 5 illustrates a graph of a target control parameter according to embodiments of the present disclosure.

FIG. 5 illustrates a graph of a target control parameter according to embodiments of the present disclosure. As shown therein, the axis of abscissa is the control voltage Un, and the axis of ordinate on the left is the target voltage $U_{AP}$. At the first stage where the control voltage is between UT0 and UT1, the target voltage is determined to have a constant voltage value $V_{AP\_S1}$; at the second stage where the control voltage is between UT1 and UT2, the target voltage is linearly reduced from $V_{AP\_S1}$ to $V_{AP\_S3}$; and at the third stage where the control voltage is greater than UT2, the target voltage is determined to have the constant voltage value $V_{AP\_S3}$.

The above process may be expressed through the following Equation (1):

$$V_{AP} = \begin{cases} V_{AP\_S1} & (Un < UT1) \\ a * Un + b & (UT1 \le Un < UT2) \\ V_{AP\_S3} & (Un < UT2) \end{cases} \quad (1)$$

Wherein, $V_{AP}$ is a target voltage, Un is a control voltage, $V_{AP\_S1}$ and $V_{AP\_S3}$ are respectively a first voltage value and a second voltage value, UT1 and UT2 are respectively a first threshold and a second threshold, and a and b are coefficients of the linear function of the second stage (i.e., T1≤Un<UT2).

In addition, the control voltage Un in Equation (1) may be in the form of a standard voltage $V_{STD}$. Specifically, sampling may be performed for the control voltage Un to acquire N sampling voltage values, and the standard voltage $V_{STD}$ may be computed using the following equation:

$$V_{STD} = \sqrt{N^{-1} * \sum_{i=1}^{i=N} Un(i)^2} \quad (2)$$

Wherein, Un(i) is the $i^{th}$ sampling voltage value of the control voltage Un. Therefore, the standard voltage $V_{STD}$ may be used to substitute for the Un in Equation (1). In this way, the real-time size of the control voltage Un can be determined accurately to identify the stage where the control voltage Un is located, and can be applied to two cases where the control voltage Un is an AC voltage and a DC voltage.

In some embodiments of the present disclosure, the set or selected first threshold UT1 may meet the following condition: when the control voltage Un is the threshold UT1, the closing speed of the movable contact 410 driven by the electromagnetic assembly 100 can reach a first predetermined speed, for example, 1 m/s, and when the control voltage Un is less than the threshold UT1, the closing speed of the movable contact 410 driven by the electromagnetic assembly 100 cannot reach the first predetermined speed.

For example, an engineering testing method may be employed to gradually increase the control voltage from a low voltage (e.g. 0.8 Unmin). In the process, the target voltage $V_{AP}$ may be set sufficiently high in the control device 300, to ensure that the regulation device 200 can output a maximum voltage. For example, the regulation device 200 is controlled at a duty cycle of 100% or in an over-modulation manner. Then, the change of the closing speed may be observed as the control voltage increases, where the closing speed may be acquired using a sensing device such as a laser speed sensor, or the like. If observed that the electric switch can be closed when the voltage is lower than a certain control voltage, but the closing speed is lower than a predetermined speed (e.g. 1 m/s), and if the closing speed of the electric switch just reaches the predetermined speed when the voltage is the control voltage, the control voltage may be determined as the first threshold UT1.

In some embodiments of the present disclosure, the set or selected first voltage value $V_{AP\_S1}$ may meet the following condition: when the target voltage $V_{AP}$ is equal to the first voltage value $V_{AP\_S1}$ and the control voltage Un is equal to a predetermined voltage (e.g. 0.8 Unmin or Unmin), the electromagnetic assembly 100 can drive the movable contact 410 to contact with the static contact 420, where the predetermined voltage is lower than the first threshold UT1. Specifically, the first voltage value $V_{AP\_S1}$ should be the value of the target voltage to ensure that the electric switch can be closed at a low voltage.

In some embodiments of the present disclosure, the set or selected second threshold UT2 may meet the following condition: when the target voltage $V_{AP}$ is equal to the second voltage value $V_{AP\_S3}$ and the control voltage Un is equal to the second threshold UT2, the closing speed of the movable contact 410 driven by the electromagnetic assembly 100 is stopped from continuously increasing with the increase of the control voltage Un.

For example, an engineering testing method may be employed to continuously increase the control voltage Un from the set first threshold UT1. In the process, the second voltage value $V_{AP\_S3}$ as the target voltage $V_{AP}$ may be set based on a typical value acquired from simulation. In an embodiment, the second voltage value $V_{AP\_S3}$ may be the same as or slightly different than the typical value acquired from simulation. Then, the change of the closing speed may be observed as the control voltage increases. If it is observed that the closing speed of the electric switch is just stopped from changing or increasing when the control voltage is increased to a certain voltage (e.g. greater than or equal to Unmax), the control voltage at this time may be determined as a second threshold UT2.

Moreover, after the first threshold UT1 and the first voltage value $V_{AP\_S1}$, and the second threshold UT2 and the second voltage value $V_{AP\_V3}$ are set, a straight line can be determined between a first point (UT1, $V_{AP\_S1}$) and a second point (UT2, $V_{AP\_S3}$) in the coordinate system of FIG. 5, to further determine the coefficients a and b in Equation (1).

Figure 6:
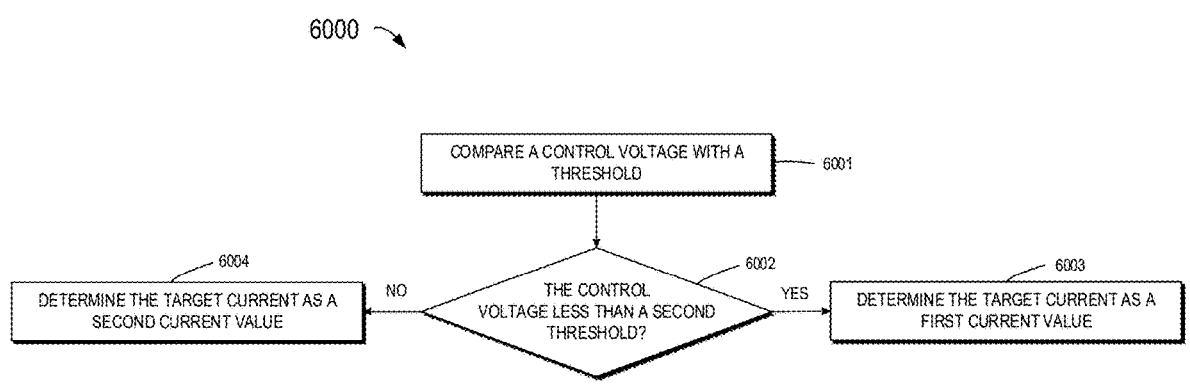
FIG. 6 illustrates a schematic flowchart of an example process of determining a target control parameter according to embodiments of the present disclosure.

FIG. 6 illustrates a schematic flowchart of an example process 6000 of determining a target current in target control parameters. The process as shown in FIG. 6 can be implemented at block 3002 of FIG. 3.

At block 6001, the control device 300 compares a control voltage Un with a threshold.

At block 6002, the control device 300 determines whether the control voltage Un is less than a second threshold UT2.

At block 6003, if the control voltage Un is less than the second threshold UT2, the control device 300 determines that the target current as a first current value $I_{AP\_S1\_S2}$. For example, the target parameter module 310 of the control device 300 may preset a plurality of target currents. These target currents at least include a first current value $I_{AP\_S1\_S2}$ and a second current value $I_{AP\_S3}$, where the first current value $I_{AP\_S1\_S2}$ is greater than the second current value $I_{AP\_S3}$. When the control voltage Un is less than the second threshold UT2, it can be determined that the control voltage Un is at a first stage and a second stage where the voltage is low, and the target current of the first stage and the second stage may be set to the higher first current value $I_{AP\_S1\_S2}$, to ensure that the electromagnetic assembly 100 can drive the movable contact 410 at a low control voltage to move in a sufficiently high closing speed, thus implementing closing successfully.

At block 6004, if the control voltage Un is not less than the second threshold UT2, the control device 300 determines the target current as the second current value $I_{AP\_S3}$. For example, when the control voltage Un is greater than or equal to the second threshold UT2, it can be determined that the control voltage Un is at a third stage where the voltage is high. At the third stage, since the control voltage Un is high, the target current may be set to the lower second current value $I_{AP\_S3}$, to ensure that the closing speed at the third stage will not increase. In order to simplify control, the first current value $I_{AP\_S1\_S2}$ and the second current value $I_{AP\_S3}$ may be constant.

Returning to FIG. 5 where the axis of abscissa is the control voltage Un, and the axis of ordinate on the right is the target current $I_{AP}$. When the control voltage is at the first stage and the second stage between UT0 and UT2, it is determined that the target current is the higher constant current value $I_{A\_S1\_S2}$; and when the control voltage is at the third stage of being greater than UT2, it is determined that the target current is the lower constant current value $I_{AP\_S3}$.

The above process may be expressed with the following Equation (3):

$$I_{AP} = \begin{cases} I_{AP\_S1\_S2} & (Un < UT2) \\ I_{AP\_S3}(Un \geq UT2) \end{cases} \quad (3)$$

Wherein, $I_{AP}$ is the target current, and $I_{AP\_S1\_S2}$ and $I_{AP\_S3}$ are respectively a first current value and a second current value. Similar to the one in Equation (1), the Un in Equation (3) may be in the form of a standard voltage $V_{STD}$, and therefore can be replaced with the $V_{STD}$ acquired through Equation (2).

Figure 7:
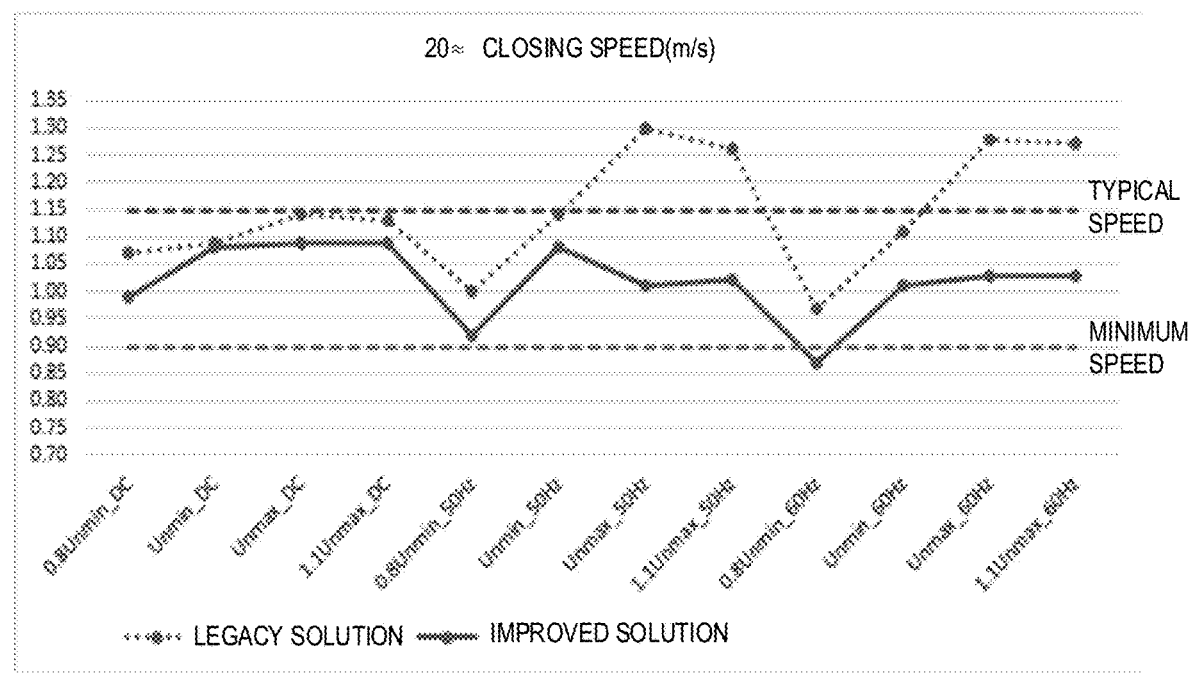
FIG. 7 illustrates a schematic diagram of comparison between a legacy solution and an improved solution according to embodiments of the present disclosure.

FIG. 7 illustrates a schematic diagram of comparison between a legacy solution and an improved solution according to embodiments of the present disclosure. In FIG. 7, the axis of abscissa is the control voltage Un of the electric switch 1000, and the axis of ordinate is the closing speed of the electric switch 1000. FIG. 7 shows the change of the closing speed of the control voltage Un at a DC voltage (ranging from 0.8 Unmin_DC to 1.1 Unmax_DC), a 50 Hz AC voltage (ranging from 0.8 Unmin_50 Hz to 1.1 Unmax_50 Hz), and a 60 Hz AC voltage (ranging from 0.8 Unmin_60 Hz to 1.1 Unmax_60 Hz). As can be seen therefrom, the closing speed in the improved solution has a smaller variation range than that in the legacy solution, which means that the closing speed in the improved solution is more stable. The maximum closing speed at the DC voltage is reduced from 1.15 m/s to 1.10 m/s, the maximum closing speed at the 50 Hz AC voltage is reduced from 1.30 m/s to 1.10 m/s, and the maximum closing speed at the 60 Hz AC voltage is reduced from nearly 1.30 m/s to less than 1.05 m/s. In addition, the minimum closing speed at the DC voltage is close to 1.00 m/s, the minimum closing speed at the 50 Hz AC voltage is greater than 0.90 m/s, and the minimum closing speed at the 60 Hz AC voltage is close to 0.90 m/s. It can be seen that the improved control solution cannot only ensure that the electric switch can be closed successfully within a wider voltage range, but can also reduce significantly the closing speed of the electric switch, avoiding impact of an exceeding high closing speed on the contacts and thus prolonging the service life of the electric switch and the contacts thereof. Moreover, the appropriate closing speed reduces the possibility of mechanical interlock failure, thus eliminating the potential of accidents caused by interlock failure.

Figure 8:
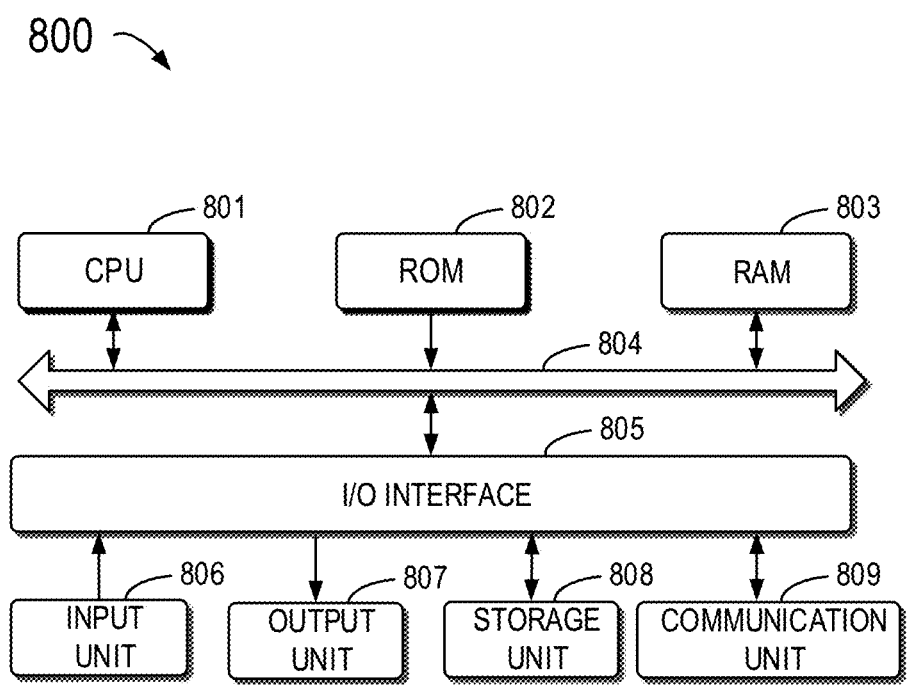
FIG. 8 illustrates a schematic block diagram of an example apparatus that can be used to implement embodiments of the present disclosure.

FIG. 8 illustrates a schematic block diagram of an example apparatus 800 that can be used to implement embodiments of the present disclosure. The apparatus 800 may be implemented as the control device 300 as shown in FIGS. 1 and 2. The control device 300 may be used to implement the method 3000 as shown in FIG. 3.

As shown therein, the apparatus 800 includes a central processing unit (CPU) 801 which can perform various appropriate acts and processing, based on computer program instructions stored in a read-only memory (ROM) 802 or computer program instructions loaded from a storage unit 808 to a random access memory (RAM) 803. The RAM 803 can store therein various programs and data required for operations of the device 800, for example, measurement data as mentioned above. The CPU 801, the ROM 802 and the RAM 803 are connected via a bus 804 with one another. An input/output (I/O) interface 805 is also connected to the bus 804.

The following components in the device 800 are connected to the I/O interface 805: an input unit 806, an output unit 807, a storage unit 808, and a communication unit 809. The communication unit 809 allows the apparatus 800 to exchange information/data with other apparatus via wired or wireless communication links.

Various processes and processing described above, e.g., the method 3000, may be executed by the processing unit 801. For example, in some embodiments, the method 3000 can be implemented as a computer software program or computer program product that is tangibly included in a machine readable medium, for example, a non-transitory computer readable medium, such as the storage unit 808. In some embodiments, part or all of the computer programs may be loaded and/or mounted onto the apparatus 800 via ROM 802 and/or communication unit 809. When the computer program is loaded to the RAM 803 and executed by the CPU 801, one or more steps of the method 3000 as described above may be executed. Alternatively, in other embodiments, the CPU 801 can be configured in any other appropriate manner (e.g., by means of firmware) to perform the method 3000.

It would be appreciated by those skilled in the art that the respective steps of the method of the present disclosure, as described above, may be implemented by general-purpose computing device(s); they may be clustered on a single computing device, or distributed over a network comprised of a plurality of computing devices; alternatively, they may be implemented by program code executable by a computing device such that they can be stored in a storage device to be executed by the computing device, or they may be made into individual integrated circuit modules, or a plurality of modules or steps therein may be made into a single integrated circuit module. As such, the present disclosure is not limited to any specific combination of hardware and software.

It is to be understood that, although some devices or sub-devices of the apparatus have been mentioned above, such division is only provided exemplarily, rather than restrictively. In fact, according to embodiments of the present disclosure, features and functions of two or more devices as described above may be implemented in a single device. In turn, features and functions of a single device as described above may be further divided to be implemented by multiple devices.

The above is only description about optional embodiments of the present disclosure, without suggesting any limitation to the present disclosure, and it is apparent to those skilled in the art that the present disclosure may cover various modifications and variations. Within the spirits and principle of the present disclosure, any modification, equivalent substitution, improvement, and the like, shall fall into the protection scope thereof.

We claim:

1. A control method for an electric switch, comprising:
   obtaining a voltage signal representing a control voltage, the control voltage input to the electric switch and applied to an electromagnetic assembly of the electric switch via a regulation device of the electric switch;
   determining, based on the voltage signal obtained, a target control parameter for the electromagnetic assembly, the target control parameter comprising at least one of a target voltage and a target current, the target voltage and the target current representing a voltage and current desired to be applied to the electromagnetic assembly, respectively; and
   generating, based on the target control parameter determined, a control signal for the regulation device, to cause the electromagnetic assembly to drive a movable contact of the electric switch to contact a static contact of the electric switch.

2. The control method of claim 1, wherein determining, based on the voltage signal obtained, the target control parameter for the electromagnetic assembly comprises:
   in response to the control voltage being less than a first threshold, determining the target voltage as a first voltage value;
   in response to the control voltage being not less than a second threshold, determining the target voltage as a second voltage value, the second threshold being greater than the first threshold, and the second voltage value being less than the first voltage value; and
   in response to the control voltage being not less than the first threshold and less than the second threshold, calculating, based on the voltage signal representing the control voltage, a third voltage value between the first voltage value and the second voltage value, and determining the target voltage as the third voltage value.

3. The control method of claim 2, wherein the third voltage value is linearly reduced from the first voltage value to the second voltage value as the control voltage is increased from the first threshold to the second threshold.

4. The control method of claim 1, wherein determining, based on the voltage signal obtained, the target control parameter for the electromagnetic assembly comprises:
   in response to the control voltage being less than a second threshold, determining the target current as a first current value; and
   in response to the control voltage being not less than the second threshold, determining the target current as a second current value that is less than the first current value.

5. The control method of claim 2, wherein the first threshold is selected such that: when the control voltage is equal to the first threshold, a closing speed of the movable contact driven by the electromagnetic assembly can reach a first predetermined speed; and when the control voltage is less than the first threshold, the closing speed of the movable contact driven by the electromagnetic assembly cannot reach the first predetermined speed.

6. The control method of claim 2, wherein the first voltage value is selected such that: when a value of the target voltage is equal to the first voltage value and the control voltage is equal to a predetermined voltage, the electromagnetic assembly can drive the movable contact to contact the static contact, the predetermined voltage being less than the first threshold.

7. The control method of claim 2, wherein the second threshold is selected such that: when a value of the target voltage is equal to the second voltage value and the control voltage is equal to the second threshold, a closing speed of the movable contact driven by the electromagnetic assembly is stopped from continuing to increase with increase of the control voltage.

8. A control device for an electric switch, comprising:
   a processor; and
   a memory coupled to the processor and having instructions stored therein, the instructions, when executed by the processor, causing the control device to execute the method of claim 1.

9. An electric switch, comprising the control device for the electric switch of claim 8.

10. A non-transitory computer readable storage medium having computer program code stored thereon, the computer program code, when running, executing the method of claim 1.

* * * * *